(12) United States Patent
Helmer et al.

(10) Patent No.: US 6,710,128 B1
(45) Date of Patent: Mar. 23, 2004

(54) PROCESS TO PRODUCE AN AQUEOUS COMPOSITION

(75) Inventors: Bradley James Helmer, Kingsport, TN (US); Glenn Lewis Shoaf, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 10/319,728

(22) Filed: Dec. 13, 2002

(51) Int. Cl.$^7$ .................................................. C08F 2/24
(52) U.S. Cl. ...................... 525/88; 525/291.5; 525/227; 525/213; 525/270; 524/798; 524/560; 524/800; 524/812; 524/824; 524/823
(58) Field of Search ................................ 524/798, 560, 524/800, 812, 824, 823; 525/88, 291.5, 227, 213, 270

(56) References Cited

U.S. PATENT DOCUMENTS

| | | | |
|---|---|---|---|
| 2,551,600 A | | 5/1951 | Holland et al. |
| 4,411,954 A | | 10/1983 | Butch et al. |
| 4,460,728 A | | 7/1984 | Schmidt, Jr. et al. |
| 4,526,577 A | | 7/1985 | Schmidt, Jr. et al. |
| 4,879,333 A | | 11/1989 | Frazee |
| 4,929,660 A | * | 5/1990 | Chen ........................... 524/236 |
| 4,939,190 A | * | 7/1990 | Tomioka et al. ............ 523/206 |
| 5,013,784 A | | 5/1991 | Yang |
| 5,095,065 A | | 3/1992 | Yang |
| 5,106,902 A | | 4/1992 | Yang |
| 5,164,441 A | | 11/1992 | Yang |
| 5,179,151 A | | 1/1993 | Yang |
| 5,242,754 A | | 9/1993 | Yang |
| 5,317,055 A | * | 5/1994 | Yang ........................... 524/458 |
| 5,326,843 A | * | 7/1994 | Lorah et al. .............. 526/318.6 |
| 5,349,026 A | | 9/1994 | Emmons et al. |
| 5,371,148 A | | 12/1994 | Taylor et al. |
| 5,686,190 A | * | 11/1997 | Mennucci et al. ........... 428/472 |
| 5,686,518 A | | 11/1997 | Fontenot et al. |
| 5,728,579 A | | 3/1998 | Morrison et al. |
| 6,407,162 B1 | * | 6/2002 | Schultz et al. .............. 524/815 |

FOREIGN PATENT DOCUMENTS

GB     1 259 459     1/1972

OTHER PUBLICATIONS

Wang et al., "Emulsion and Miniemulsion Copolymerization of Acrylic Monomers in the Presence of Alkyd Resin," *Journal of Applied Polymer Science*, vol. 60, pp. 2069–2076 (1996).

* cited by examiner

*Primary Examiner*—David W. Wu
*Assistant Examiner*—Satya Sastri
(74) *Attorney, Agent, or Firm*—Polly C. Owen; Bernard J. Graves, Jr.

(57) ABSTRACT

A process is provided to produce an aqueous composition. The process comprises shearing a mixture to produce a mini-emulsion and polymerizing said mini-emulsion in the presence of an initiator to produce the aqueous composition; wherein said mixture comprises at least one tackifier, at least one ethylenically unsaturated monomer, at least one surfactant, and water. The aqueous composition can be utilized to produced various articles including, but not limited to, adhesives, coatings, and laminates.

46 Claims, No Drawings

PROCESS TO PRODUCE AN AQUEOUS COMPOSITION

FIELD OF THE INVENTION

The invention relates to a process to produce an aqueous composition comprising shearing a mixture to produce a mini-emulsion and polymerizing the mini-emulsion to produce the aqueous composition wherein the mixture comprises at least one tackifier, at least one ethylenically unsaturated monomer, at least one surfactant, and water. The inventive aqueous compositions are useful as adhesives, including pressure sensitive adhesives, such as, for example, tapes, labels, stickers, decals, decorative vinyls, laminates, and wall coverings.

BACKGROUND OF THE INVENTION

The production of water-based adhesives is conventionally accomplished in three basic steps. First, a latex of a vinyl polymer is prepared using emulsion polymerization processes well known in the art. In a separate step, a tackifier dispersion is prepared by combining at least one tackifier, at least one surfactant, and water and subjecting this mixture to high shear to produce a tackifier dispersion. Then, the tackifier dispersion is combined with the latex to produce an aqueous composition useful for preparation of a water-based adhesive.

Another process, which has been described in the art, involves the dissolution of a tackifier with at least one monomer in the preparation of the latex. This process avoids the tackifier dispersion step described in the previous process. However, this process is ineffective in that high scrap levels in the emulsion polymerization process can result. High scrap levels are undesirable since the yield of useful product is diminished and filtration problems can result. Therefore, there is a need for an improved process that combines tackifiers and latexes to produce an adhesive without undesirable scrap levels.

SUMMARY OF THE INVENTION

In accordance with this invention, a process to produce an aqueous composition is provided. The process comprises shearing a mixture to produce a mini-emulsion and polymerizing the mini-emulsion in the presence of an initiator to produce the aqueous composition; wherein the mixture comprises at least one tackifier, at least one ethylenically unsaturated monomer, at least one surfactant, and water.

This inventive process produces an aqueous composition that has the advantage of combining tackifiers and vinyl polymers prior to polymerizing. Therefore, the additional process step of dispersing a tackifier in the latex is not required. The invention is further advantageous in that the process uses mini-emulsion polymerization and avoids the process problems that occur when tackifiers and monomers are polymerized using conventional emulsion polymerization processes namely the production of undesirable scrap levels. The aqueous compositions are also advantaged over the art since the surfactant normally required to disperse the tackifier is not needed.

DETAILED DESCRIPTION OF THE INVENTION

A process to produce an aqueous composition is provided. The process comprises shearing a mixture to produce a mini-emulsion and polymerizing the mini-emulsion in the presence of an initiator to produce an aqueous composition. The mixture comprises at least one tackifier, at least one ethylenically unsaturated monomer, at least one surfactant, and water.

Any tackifier known in the art that can yield the properties desired in the aqueous composition can be utilized. Generally, the tackifier can be selected from the group consisting of rosins, rosin derivatives, rosin esters, hydrocarbon resins, synthetic polyterpenes, natural terpenes, and the like. More particularly, useful tackifying resins include, but are not limited to, (1) natural and modified rosins and the hydrogenated derivatives thereof; (2) esters of natural and modified rosins and the hydrogenated derivatives thereof; (3) polyterpene resins and hydrogenated polyterpene resins; (4) aliphatic petroleum hydrocarbon resins and the hydrogenated derivatives thereof; (5) aromatic hydrocarbon resins and the hydrogenated derivatives thereof; and (6) alicyclic petroleum hydrocarbon resins and the hydrogenated derivatives thereof. Mixtures of two or more of the above-described tackifiers may be required for some formulations.

Natural and modified rosins and the hydrogenated derivatives thereof include, but are not limited to, gum rosin, wood rosin, tall-oil rosin, distilled rosin, hydrogenated rosin, dimerized rosin, and polymerized rosin.

Suitable examples of esters of natural and modified rosins and the hydrogenated derivatives thereof include, but are not limited to, the glycerol ester of rosin, the glycerol ester of hydrogenated rosin, the glycerol ester of polymerized rosin, the pentaerythritol ester of hydrogenated rosin.

Polyterpene resins generally result from the polymerization of terpene hydrocarbons, such as the bicyclic monoterpene known as pinene, in the presence of Friedel-Crafts catalysts at moderately low temperatures. Preferably, the polyterpene resins have a softening point, as determined by ASTM method E28-58T, of from about 80° C. to about 150° C.

Aliphatic petroleum hydrocarbon resins and hydrogenated derivatives thereof are generally produced from the polymerization of monomers consisting of primarily olefins and diolefins. Preferably, the aliphatic petroleum hydrocarbon resins have a Ball and Ring softening point of from about 70° C. to about 135° C.

Aromatic hydrocarbon resins include, for example, hydrocarbon resins derived from at least one alkyl aromatic monomer, such as, for example, styrene, alpha-methyl styrene and vinyl toluene, and the hydrogenated derivatives thereof The alkyl aromatic monomers can be obtained from petroleum distillate fractions or from non-petroleum feedstocks, such as, for example, feedstocks produced from phenol conversion processes.

An alicyclic petroleum hydrocarbon resin can be produced utilizing a hydrocarbon mixture comprising dicyclopentadiene as the monomer.

The ethylenically unsaturated monomer is at least one acrylic or vinyl monomer known in the art capable of substantially solubilizing the tackifier. The term "substantially solubilizing" means that at least 75% by weight of the tackifier should form a single-phase liquid in the ethylenically unsaturated monomer at the concentration specified. The ethylenically unsaturated monomer can be added as a single type of monomer or as a mixture. Examples of suitable ethylenically unsaturated monomers, include, but are not limited to, styrenic monomers such as, for example, styrene, α-methyl styrene, vinyl naphthalene, vinyl toluene, chloromethyl styrene and the like; ethylenically unsaturated compounds such as, for example, methyl acrylate, acrylic acid, methacrylic acid, methyl methacrylate, ethyl acrylate, ethyl methacrylate, butyl acrylate, butyl methacrylate, isobutyl acrylate, isobutyl methacrylate, ethylhexyl acrylate, ethythexyl methacrylate, octyl acrylate, octyl methacrylate, lauryl methacrylate, lauryl acrylate, glycidyl methacrylate, alkyl crotonates, vinyl acetate, di-n-butyl maleate, di-octylmaleate, acetoacetoxyethyl methacrylate, acetoacetoxyethyl acrylate, acetoacetoxypropyl methacrylate, acetoacetopropryl acrylate, diacetone acrylamide, acrylamide, methacrylamide, hydroxyethyl methacrylate, hydroxyethyl acrylate, acrylonitrile, and the like; and nitrogen-containing monomers, such as, for example, t-butylaminoethyl methacrylate, dimethylaminoethyl methacrylate, diethylaminoethyl methacrylate, N,N-dimethylaminopropyl methacrylamide, 2-t-butylaminoethyl methacrylate, N,N-dimethylaminoethyl acrylate, N-(2-methacryloyloxy-ethyl)ethylene urea, and methacrylamidoethylethyiene urea.

The surfactant can be any conventional surfactant or a combination of surfactants known in the art. Generally, the surfactant is at least one selected from the group consisting of an anionic surfactant and a non-ionic surfactant. Examples of preferred surfactants include, but are not limited to, alkali alkylsulfate, ammonium alkysulfate, alkylsulfonic acid, fatty acid, oxyethylated alkyphenol, sulfosuccinates and derivatives, and mixtures thereof. A list of suitable surfactants is available in the treatise: McCutcheon's Emulsifiers & Detergents, North American Edition, MC Publishing Co., Glen Rock, N.J., 1997. Preferably, the surfactant provides droplet/particle stability, but results in minimal aqueous phase nucleation (micellar or homogeneous).

The surfactant can also be a polymerizable surfactant which are surfactants that contain a polymerizable double bond. Examples of polymerizable surfactants include, but are not limited to, Hitenol BC-10, Hitenol HS 20, and Hitenol HS 10 surfactants commercially available from Dai-ichi Kogyo Seiyaku Co. and TREM LF40 surfactant available from Cognis Corporation.

In general, the tackifier portion of the aqueous composition represents about 1 to about 40 wt. %, preferably about 2 to about 30 wt. % and most preferably, 4 to 20 wt. % of the total solids of the aqueous composition. The polymer from the ethylenically unsaturated monomer represents about 60 to about 99 wt. %, preferably about 70 to about 98 wt. %, most preferably from 80 to 96 wt % of the total solids of the aqueous composition. The surfactant represents about 0.15% to about 8% of the total solids of the aqueous composition, preferably 0.5% to about 2%.

In another embodiment of this invention, the mixture further comprises a least one rubber compound. The rubber compound useful in the invention is capable of being combined with or substantially dissolved in at least one ethylenically unsaturated monomer. Natural and synthetic rubbers are useful in this invention. Natural rubbers are derived from natural sources as opposed to synthetic sources. Examples of suitable rubber compounds include, but are not limited to, natural rubber, butyl rubbers, isoprene rubbers, chloroprene rubbers including neoprene rubbers, polybutadiene rubbers, nitrile-butadiene rubbers, styrene-butadiene rubbers, polypentanamers, and ethylene-proplyene-diene terpolymers.

The tackifier, ethylenically unsaturated monomer, surfactant, and water can be combined in any order. However, all of these components must be present prior to shearing. In one embodiment of this invention, the tackifier is dissolved in at least one ethylenically unsaturated monomer to form a tackifier/monomer mixture, which is then dispersed in an aqueous medium comprising surfactant and water to form the mixture. The mixture then is sheared to form the mini-emulsion.

Shearing of the mixture produces a mini-emulsion. The shearing can be conducted by any means known in the art. Generally, shearing can be achieved using a high shearing device to form droplets ranging in size from about 50 to about 500 nanometers to form the mini-emulsion. Although not wanting to be bound by theory, it is believed that shearing the mixture to form small droplets, and thus forming the mini-emulsion, prior to polymerization, helps to ensure that the predominant nucleation site and subsequent polymerization site occurs within the droplets. This minimizes transport of the monomer from the droplets which can result in precipitation of the tackifier.

The mini-emulsion can be polymerized by any method known in the art to produce the aqueous composition. During mini-emulsion polymerization, the ethylenically unsaturated monomer are pre-emulsified as small uniform particles along with a purposely added hydrophobic component, in this case a tackifier, prior to free radical initiation. Suitable initiators include conventional initiators, such as, for example, ammonium persulfate, alkali persulfate, hydrogen peroxide, t-butyl hydroperoxide, di-benzoyl peroxide, lauryl peroxide, di-tertiarybutylperoxide, 2,2-azobisisobutyronitrile, benzoyl peroxide, and the like. Although not intending to be bound by theory, the tackifier retains the more water-soluble monomers within the original particles which are the locus of the polymerization. Hence, there is no second generation of particles as there is in conventional emulsion polymerization. The mini-emulsion, as described above, may also be polymerized as described in U.S. Pat. No. 5,686,518 and Wang et al., "Emulsion and Miniemulsion Copolymerization of Acrylic Monomers in the Presence of Alkyd Resin, "*Journal of Applied Polymer Science*, Vol. 60, pp. 2069–2076 (1996), each of which is incorporated in its entirety by reference.

The mini-emulsion polymerization process by which the aqueous composition is made may also require a reducing agent or a catalyst. Suitable reducing agents are those that increase the rate of polymerization and include, for example, sodium bisulfite, sodium hydrosulfite, sodium formaldehyde sulfoxylate, ascorbic acid, isoascorbic acid, and mixtures thereof.

Suitable catalysts are those compounds that promote decomposition of the polymerization initiator under the polymerization reaction conditions thereby increasing the rate of polymerization. Suitable catalysts include transition metal compounds. Examples of such catalysts include, but are not limited to, ferrous sulfate heptahydrate, ferrous chloride, chelated forms of ferrous sulfate heptahydrate and ferrous chloride, and mixtures thereof.

The glass transition temperature ($T_g$) of the ethylenically unsaturated monomer portion of the aqueous composition in accordance with the invention may be up to about 60° C. For applications where film formation of the aqueous composition at ambient temperature is desirable, the Tg is preferably less than about 20° C. For adhesives compositions, the glass transition temperature may preferably be in a range between −60° C. and 10° C. The $T_g$ is determined using Differential Scanning Calorimetry (DSC).

The aqueous composition of this invention can be utilized to produce adhesives, especially pressure sensitive adhesives, coatings, and laminates. Pressure sensitive adhesives (PSA) are used in a variety of applications including tapes, labels, stickers, decals, decorative vinyls, laminates, and wall coverings.

An adhesive of the invention comprises the aqueous composition of the invention and may be prepared by techniques known in the art, e.g. as disclosed in U.S. Pat. Nos. 4,879,333 and 5,728,759, each of which is incorporated in its entirety by reference. For example, the aqueous composition of the invention may be coated onto a substrate using techniques known in the art (e.g. roll-coating, curtain coating, gravure printing, slot die coating) to produce an adhesive or coated composition. The substrate can be any common substrate, such as, for example, paper, polyolefin films such as polyethylene and polypropylene, metals such as aluminum and steel, glass, urethane elastomers and primed (painted) substrates, and polyesters, including, but not limited to, terephthalate-based polyesters such as polyethylene terephthalate. The adhesive or coating composition of the invention may be cured at room temperature (ambient cure), at elevated temperatures (thermal cure), or radiation cured.

The ethylenically unsaturated monomer portion of the aqueous composition retains the desirable properties of an acrylic PSA such as peel strength, loop tack, and shear strength while the tackifier portion of the aqueous composition compliments or enhances these properties. More specifically, the tackifier portion of the aqueous composition typically enhances the peel strength and loop tack. Adhesives of the invention also offer the advantage of being water-based and having significantly less solvent, less than 25 wt % to as low as 1 wt % and even zero volatile organic compound (VOC) content.

The aqueous composition of the invention may be used neat to provide a pressure sensitive adhesive (PSA). Alternatively, it may be combined with other PSA additives such as, for example, post-added tackifiers dispersions, plasticizers, solvents, defoamers, neutralents, preservatives, surfactants, and the like. Specific examples of such additives can be found in Raw Materials Index, published by the National Paint & Coatings Association, 1500 Rhode Island Avenue, N.W., Washington, D.C. 20005. Further examples of such additives and emulsion polymerization methodology may be found in U.S. Pat. No. 5,371,148, incorporated herein by reference in its entirety.

Post-added tackifier dispersions can be any tackifier dispersion known in the art. Examples of tackifier dispersions that can be post-added to the aqueous composition are disclosed in U.S. Pat. Nos. 4,526,577, 4,460,728 and 4,411,954,; all of which are herein incorporated by reference in their entirety. Particularly useful tackifier resin dispersions that can be post-added to the aqueous composition include, but are not limited to, dispersions of the tackifiers listed previously in this disclosure.

A preferred post-added tackifier resin dispersion in the invention comprises Tacolyn 1070, Tacolyn 3179 H, Tacolyn 4603; all of which are tradenames of tackifiers commercially available from Eastman Chemical Company.

Plasticizers useful in the invention are a known class of materials, sometimes called elastomer plasticizing oils. They include paraffinic hydrocarbons, aromatic hydrocarbons, esters of aliphatic and aromatic acids, and mixtures thereof. Plasticizers are disclosed in U.S. Pat. No. 2,551,600, herein incorporated by reference in its entirety.

A preferred plasticizer for use in forming the inventive adhesive is dioctyl phthalate, provided by Eastman Chemical Company. Any plasticizer known in the art can be utilized based on the adhesive properties desired. Examples of commercially available adhesive plasticizers include "Hercolyn DE" (Eastman Chemical Company), "Neville NP 10" (Neville Chemical Co.), and "Shellflex 371" (Shell Chemical Co.).

Any solvent known in the art can be utilized based on the adhesive properties desired. Examples of solvents include, but are not limited to, ethanol, n-propanol, isopropanol, n-butanol, sec-butanol, isobutanol, ethylene glycol monobutyl ether, propylene glycol n-butyl ether, propylene glycol methyl ether, propylene glycol monopropyl ether, dipropylene glycol methyl ether, diethylene glycol monobutyl ether, trimethylpentanediol mono-isobutyrate, ethylene glycol mono-octyl ether, diacetone alcohol, TEXANOL® ester alcohol (Eastman Chemical Company), and the like. Such solvents and coalescing aids may also include reactive solvents and coalescing aids such as diallyl phthalate, SANTOLINK XI-100® polyglycidyl allyl ether from Monsanto, and others as described in U.S. Pat. Nos. 5,349,026 and 5,371,148, incorporated herein by reference.

Surfactants to be added to the aqueous composition can be any surfactant known in the art. Suitable surfactants utilized are as discussed previously in this disclosure. Other surfactants that are useful to add to the aqueous composition are acetylenic diols and ethyloxylated acetylenic diols. Examples of acetylenic diols include, but are not limited to, Surfynol 104PG, Surfynol 440, Surfynol PSA336; all which are produced by Air Products.

Neutralents to be added to the aqueous composition can be any neutralent known in the art. Suitable neutralents include, but are not limited to, alkali hydroxides and amines. Examples of alkali hydroxides include sodium hydroxide, potassium hydroxide, and lithium hydroxide. Examples of amines include ethanolamine, triethylamine, and dimethylethanolamine. Other suitable neutralents are ammonium hydroxide, zinc oxide, and ammonium complexes of zinc oxide.

Another additive that has been found useful to add to the aqueous composition is polyvinylpyrrolidone (PVP). PVP can be obtained as Luviskol K60 and Luviskol K90 commercially available from BASF.

This invention can be further illustrated by the following examples of preferred embodiments thereof, although it will be understood that these examples are included merely for purposes of illustration and are not intended to limit the scope of the invention unless otherwise specifically indicated.

EXAMPLES

The following test methods were utilized in these examples. 180° Peel Test (PSTC-1):

Five specimens (1"×12") from each coated film were placed onto panels made of stainless steel (SS) and a 4.5-lb roller was passed over each specimen five times. Five minutes after preparation the specimens were pulled at a 180° angle using an Instron instrument at a rate of 12 in/min. The reported values are an average of five tests.
Loop Tack (Modification of ASTMD-903):

The ends of 1"×12" specimens from each coated film were placed into the grips of an Instron instrument to form a loop (adhesive side down). The specimens were lowered onto a panel made of stainless steel (SS) at a rate of 12 in/min and then raised at the same rate as tack property was measured. The reported values are an average of five tests.
Hold Power (PSTC-7):

Using a 1-ml coated Mylar film, specimens were cut into 1"×3" specimens. A 1"×1" square of the adhesive specimen was centered onto a stainless steel panel and two passes were done using a 4.5-lb roller. A clamp was placed on the free end of the specimen ensuring that the clamp extended completely across the width and was properly aligned to distribute the load uniformly. The specimen was then placed in the test stand and a 1000 g mass was applied to the clamp. The time elapsed in which the specimen completely separated from the test panel was recorded. The reported values are an average of 5 tests.

Example 1

Preparation of the Aqueous Composition 62.1 grams of water were added to a reactor consisting of a 1000 mL resin kettle equipped with a condenser, nitrogen purge, and a subsurface feed tube. A nitrogen purge was begun, and the contents heated and maintained at 80° C.

Foral 105E® rosin ester obtained from Eastman Chemical Company was dissolved in a mixture of butyl acrylate (348.9 g), methyl methacrylate (39.7 g), and acrylic acid (7.9 g) to produce a monomer/tackifier mixture. Water (307.5 g) and surfactant (5.3 g of Aerosol OT-75, commercially available from Cytec Industries, West Patterson, N.J.) were premixed to produce a water/surfactant mixture. Next, the tackifier/monomer mixture was added to the water/surfactant mixture to form a pre-emulsion. The pre-emulsion was sheared using an IKA (Model SD-45) rotor/stator homogenizer by circulating through a flow cell which surrounded the shearing device (approximately 15 minute residence time) with the homogenizer operating at 100% output to form a mini-emulsion.

Ammonium persulfate (0.3 g) was mixed in water (6.3 g) and charged to the reactor. Sodium metabisulfite (0.2 g) was mixed in water (6.3 g) and charged to the reactor. Ethylenediaminetetraacetic acid 1% solution (0.8 g) and iron(II) sulfate heptahydrate 1 wt % solution (1.7 g) were added to the reactor. The mini-emulsion was fed over 250 minutes to the reactor. Simultaneously, an initiator feed composed of water (25.2 g ), ammonium persulfate (2.0 g), and ammonium hydroxide 28 wt % (2.1 g) and another feed composed of water (27.0 g) and sodium metabisulfite (1.0 g) were also fed over 260 minutes. After the feeds ended, the reactor was held at 80° C. for 15 minutes, then a reductant solution consisting of water (5.0 g) and isoascorbic acid (0.75 g) was fed into the reactor over 15 minutes. A solution of water (5.0 g) and 70% t-butyl hydroperoxide (1.1 g) was simultaneously fed over 15 minutes. The reaction mix was then cooled. The aqueous composition produced was filtered through a 100 mesh wire screen and filterable solids or scrap collected. If more than 20 grams of scrap material was collected, the filtration was terminated, and the result was reported as >20 g.

The droplet size of the mini-emulsion, and the particle size and pH of the aqueous composition produced were determined. The droplet and particle sizes were measured using Mictrotrac Ultrafine Particle Analyzer laser light-scattering device (180° backscattering) manufactured by Leeds & Northrup, North Wales, Pa. The droplets were diluted approximately 1:50 in a monomer saturated water solution. The particles were diluted approximately 1:50 in water. Property data of the aqueous composition are summarized in Table 1. The inventive process shown in this example produced a very low level of filterable scrap (<0.10 gram) thus showing the effectiveness of the process.

Comparative Example 2
Preparation of Tackifier Modified Acrylic Latex Without Shearing (Regular Emulsion Polymer)

A tackifier modified acrylic latex was prepared following the procedure of Example 1, except that the pre-emulsion was not sheared to form a mini-emulsion. The property data of the non-sheared tackifier modified acrylic latex are summarized in Table 1. As illustrated in Table 1, very high levels of scrap resulted in this procedure that renders the process commercially unacceptable.

Comparative Example 3
Preparation of an Acrylic Latex

An acrylic latex was prepared following the procedure of Example 1, except that the tackifier was omitted. The property data of the acrylic latex are summarized in Table 1. As shown in Table 1, unacceptable levels of scrap resulted in this procedure.

TABLE 1

| Example | Tackifier Level (wt. %) | Shear | Scrap Grams | % Solids | pH | Droplet Size (Microns) | Final Particle Size (nm) |
|---|---|---|---|---|---|---|---|
| 1 | 10% | Yes | <0.10 | 48.6 | 4.2 | 0.280 | 371 |
| 2 | 10% | No | >20.0 | 48.7 | 4.4 | >1.4 | 470 |
| 3 | 0% | Yes | >20.0 | 45.6 | 4.3 | >1.1 | 577 |

Examples 4–17

In examples 4–17, a series of aqueous compositions were prepared using the same procedure as Example 1, but varying the type and level of tackifier.

TABLE 2

| Trade Name | Chemistry |
|---|---|
| Foral AXE | Hydrogenated Rosin Acid |
| Permalyn 2085 | Tall oil rosin glycerol ester |
| Staybelite Ester 10E | Partially hydrogenated rosin glycerol ester |
| Foral 85E | Hydrogenated rosin glycerol ester |
| Foral 105E | Hydrogenated rosin pentaerythritol ester |
| Piccotac 1095 | $C_5$ hydrocarbon resin |
| Eastotac H100W | Hydrogenated $C_5$ hydrocarbon resin |
| Picco 6100 | $C_9$ hydrocarbon resin |
| Regalite R1100 | Hydrogenated $C_9$ hydrocarbon resin |
| Piccolastic A75 | Pure monomer (polystyrene) resin |

* All tackifiers are commercially available from Eastman Chemical Company.

TABLE 3

| | Tackifier | Percent | pH | Solids (%) | Scrap (g) | PS[1] (nm) |
|---|---|---|---|---|---|---|
| 4 | Foral AXE | 10 | 4.3 | 44.7 | 0.1 | 390 |
| 5 | Permalyn 2085 | 2 | 4.4 | 49.1 | 1.0 | 524 |
| 6 | Staybelite Ester 10E | 2 | 4.4 | 47.5 | 5.0 | 551 |
| 7 | Staybelite Ester 10E | 10 | 4.2 | 41.4 | 5.0 | 594 |
| 8 | Foral 85E | 2 | 4.6 | 49.1 | 0.3 | 402 |
| 9 | Foral 85E | 5 | 4.5 | 48.4 | 0.3 | 442 |
| 10 | Foral 85E | 10 | 4.5 | 47.5 | 0.3 | 260 |
| 11 | Foral 105E | 5 | 4.7 | 50.0 | 0.1 | 372 |
| 12 | Piccotac 1095 | 10 | 4.6 | 47.2 | 0.1 | 336 |
| 13 | Eastotac H100W | 10 | 4.7 | 45.3 | 0.1 | 263 |
| 14 | Picco 6100 | 10 | 4.7 | 46.5 | 0.1 | 267 |
| 15 | Picco 6100 | 20 | 4.4 | 47.8 | 0.7 | 306 |
| 16 | Regalite R1100 | 10 | 4.7 | 48.0 | 0.1 | 276 |
| 17 | Piccolastic A75 | 10 | 4.8 | 46.2 | 0.1 | 273 |

[1]PS—Particle Size

As can be seen from the data in Table 3, minimal scrap is produced when a tackifier, ethylenically unsaturated monomer, surfactant, and water are utilized to produce a pre-emulsion, and the pre-emulsion is sheared to produce a mini-emulsion.

Examples 18–21
Preparation of Aqueous Compositions with Varying Monomers

In examples 18–21, a series of aqueous compositions were prepared using the same procedure as Example 1, but varying the monomer type while using a constant tackifier type and level (10 wt. % Picco 6100 hydrocarbon resin obtained from Eastman Chemical Company).

TABLE 4

| Composition | Tg (calc) | pH | Solids (%) | Scrap (g) | PS[1] (nm) |
| --- | --- | --- | --- | --- | --- |
| 18 BA/AA, 98/2 | −40.2 | 4.2 | 48.6 | 0.1 | 293 |
| 19 BA/Sty/AA, 88/10/2 | −30.6 | 4.1 | 50.5 | 0.7 | 313 |
| 20 EHA/MMA/AA, 88/10/2 | −41.7 | 3.8 | 48.7 | 2.0 | 300 |
| 21 BA/MMA/MAA, 88/10/2 | −29.1 | 5.7 | 47.6 | 0.1 | 267 |

[1]PS—Particle Size
Monomer Abbreviations:
AA: acrylic acid
BA: butyl acrylate
EHA: ethylhexyl acrylate
MAA: methacrylic acid
MMA: methyl methacrylate
Sty: styrene As can be seen by the data in Table 4. regardless of the ethylenically unsaturated monomer utilized, the aqueous composition produced had a low amount of scrap.

Examples 22–41
Adhesive Testing

TABLE 5

| Formulation for Adhesive Testing | | |
| --- | --- | --- |
| Component | Description | Amount (g) |
| Aqueous Composition | Adhesive | 100 |
| Ammonium Hydroxide, 28 wt % | Neutralent | 0.6 |
| Surfynol PSA336, 67 wt % | Surfactant | 0.5 |
| Polyphobe[1] 104, 20 wt % | Thickener | 1.0 |

[1]Polyphobe 104 was obtained from Dow Chemical Company.

Adhesive formulations were prepared containing the components as shown in Table 5. Formulations were coated to approximately 1-mil dry film thickness on a Mylar polyester film to produce a coated film. The coated film was tested for 180° Peel, Loop Tack, and Hold Strength. The data are tabulated below.

TABLE 6

| Example # | Aqueous Composition Produced From Example # | pH | Viscosity cps | Coat wt. (mils) | 180° Peel Test (#/in) | Loop Tack (#/in) | Hold Power (hr) |
| --- | --- | --- | --- | --- | --- | --- | --- |
| 22 | 1 | 8.7 | 62 | 1.04 | 5.3 | 2.1 | 1.7 |
| 23 | C2 | 8.7 | 64 | 1.06 | 4.9 | 1.3 | 1.4 |
| 24 | C3 | 8.9 | 75 | 1.05 | 1.3 | 1.2 | >48 |
| 25 | 4 | 8.4 | 200 | 1.04 | 0.9 | 2.1 | 0.1 |
| 26 | 5 | 8.8 | 72 | 0.99 | 2.0 | 1.6 | >48 |
| 27 | 6 | 8.4 | 1560 | 0.95 | 2.8 | 1.7 | 0.6 |
| 28 | 8 | 9.0 | 139 | 0.95 | 1.6 | 1.3 | >48 |
| 29 | 9 | 8.8 | 259 | 0.98 | 1.9 | 1.4 | >48 |
| 30 | 10 | 9.1 | 224 | 0.90 | 2.7 | 2.3 | 1.5 |
| 31 | 11 | 8.5 | 185 | 1.06 | 2.1 | 1.3 | 10 |
| 32 | 12 | 9.0 | 83 | 0.97 | 0.8 | 0.5 | >48 |
| 33 | 13 | 9.1 | 217 | 1.00 | 1.0 | 1.1 | 31 |
| 34 | 14 | 9.0 | 91 | 1.01 | 1.6 | 0.9 | >48 |
| 35 | 15 | 9.1 | 98 | 1.02 | 2.1 | 0.9 | 10 |
| 36 | 16 | 9.1 | 161 | 1.01 | 0.9 | 1.1 | >48 |
| 37 | 17 | 9.0 | 406 | 1.03 | 2.1 | 1.3 | 14 |

The aqueous compositions produced in Examples 18–21 with 10% Picco 6100 tackifier were utilized as adhesives. The data are tabulated below.

TABLE 7

| Example # | Aqueous Composition Produced In Example # | pH | Viscosity cps | Coat wt. (mils) | 180° Peel Test (#/in) | Loop Tack (#/in) | Hold Power (hr) |
| --- | --- | --- | --- | --- | --- | --- | --- |
| 38 | 19 | 8.8 | 71 | 1.00 | 3.5 | 1.3 | 2.4 |
| 39 | 20 | 8.7 | 820 | 1.07 | 2.5 | 1.0 | 9.9 |
| 40 | 21 | 8.4 | 80 | 0.98 | 1.9 | 2.0 | 11.1 |
| 41 | 22 | 9.3 | 48 | 0.99 | 1.7 | 1.0 | 42.2 |

This inventive process provides an aqueous composition that can be utilized in adhesives having a wide range of desirable properties for various applications.

That which is claimed is:

1. A process to produce an aqueous composition comprising shearing a mixture to produce a mini-emulsion and polymerizing said mini-emulsion in the presence of an initiator to produce said aqueous composition; wherein said mixture comprises at least one tackifier, at least one ethylenically unsaturated monomer, at least one surfactant, and water.

2. A process according to claim 1 wherein said tackifier is at least one selected from the group consisting of rosins, rosin derivatives, rosin esters, hydrocarbon resins, synthetic polyterpenes, and natural terpenes.

3. A process according to claim 2 wherein said tackifier is at least one selected from the group consisting of natural and modified rosins and the hydrogenated derivatives thereof; esters of natural and modified rosins and the hydrogenated derivatives thereof; polyterpene resins and hydrogenated polyterpene resins; aliphatic petroleum hydrocarbon resins and the hydrogenated derivatives thereof; aromatic hydrocarbon resins and the hydrogenated derivatives thereof; and alicyclic petroleum hydrocarbon resins and the hydrogenated derivatives thereof.

4. A process according to claim 1 wherein said tackifier is at least one selected from the group consisting of rosins, rosin derivatives, rosin esters, and hydrocarbon resins.

5. A process according to claim 4 wherein said tackifier is at least one selected from the group consisting of natural and modified rosins and the hydrogenated derivatives thereof; esters of natural and modified rosins and the hydrogenated derivatives thereof; aliphatic petroleum hydrocarbon resins and the hydrogenated derivatives thereof; aromatic hydrocarbon resins and the hydrogenated derivatives thereof; and alicyclic petroleum hydrocarbon resins and the hydrogenated derivatives thereof.

6. A process according to claim 3 or 5 wherein said natural and modified rosins and the hydrogenated derivatives thereof are selected from the group consisting of gum rosin, wood rosin, tall-oil rosin, distilled rosin, hydrogenated rosin, dimerized rosin, and polymerized rosin.

7. A process according to claim 3 or 5 wherein said esters of natural and modified rosins and the hydrogenated derivatives thereof are selected from the group consisting of the glycerol ester of rosin, the glycerol ester of hydrogenated rosin, the glycerol ester of polymerized rosin, and the pentaerythritol ester of hydrogenated rosin.

8. A process according to claim 3 wherein said polyterpene resins and hydrogenated polyterpene resins have a softening point of from about 80° C. to about 150° C.

9. A process according to claim 3 or 6 wherein said aliphatic petroleum hydrocarbon resins and the hydrogenated derivatives thereof have a Ball and Ring softening point of from about 70° C. to about 135° C.

10. A process according to claim 3 wherein said aromatic hydrocarbon resins are derived from at least one alkyl aromatic monomer selected from the group consisting of styrene, alpha-methyl styrene and vinyl toluene, and the hydrogenated derivatives thereof.

11. A process according to claim 3 or 5 wherein said alicyclic petroleum hydrocarbon resin is produced using a hydrocarbon mixture comprising dicyclopentadiene as the monomer.

12. A process according to claim 1 wherein said ethylenically unsaturated monomer is at least one selected from the group consisting of styrenic monomers, ethylenically unsaturated compounds, and nitrogen-containing compounds.

13. A process according to claim 12 wherein said styrenic monomer is at least one selected from the group consisting of styrene, α-methyl styrene, vinyl naphthalene, vinyl toluene, and chloromethyl styrene.

14. A process according to claim 12 wherein said ethylenically unsaturated compound is at least one selected from the group consisting of methyl acrylate, acrylic acid, methacrylic acid, methyl methacrylate, ethyl acrylate, ethyl methacrylate, butyl acrylate, butyl methacrylate, isobutyl acrylate, isobutyl methacrylate, ethylhexyl acrylate, ethylhexyl methacrylate, octyl acrylate, octyl methacrylate, lauryl methacrylate, lauryl acrylate, glycidyl methacrylate, alkyl crotonates, vinyl acetate, di-n-butyl maleate, di-octylmaleate, acetoacetoxyethyl methacrylate, diacetone acrylamide, acrylamide, methacrylamide, hydroxyethyl methacrylate, hydroxyethyl acrylate, and acrylonitrile.

15. A process according to claim 12 wherein said nitrogen-containing monomer is at least one selected from the group consisting of t-butylaminoethyl methacrylate, dimethylaminoethyl methacrylate, diethylaminoethyl methacrylate, N,N-dimethylaminopropyl methacrylamide, 2-t-butylaminoethyl methacrylate, N,N-dimethylaminoethyl acrylate, N-(2-methacryloyloxy-ethyl)ethylene urea, and methacrylamidoethylethylene urea.

16. A process according to claim 1 wherein said surfactant is at least one selected from the group consisting of an anionic surfactant and a non-ionic surfactant.

17. A process according to claim 16 wherein said surfactant is at least one selected from the group consisting of alkali alkylsulfate, ammonium alkysulfate, alkylsulfonic acid, fatty acid, oxyethylated alkyphenol, and sulfosuccinates and derivatives.

18. A process according to claim 16 wherein said surfactant is at least one polymerizable surfactant.

19. A process according to claim 1 wherein the tackifier portion of the aqueous composition represents about 1 to about 40 wt. % of the total solids of the aqueous composition.

20. A process according to claim 19 wherein the tackifier portion of the aqueous composition represents about 2 to about 30 wt. % of the total solids of the aqueous composition.

21. A process according to claim 20 wherein the tackifier portion of the aqueous composition represents 4 to 20 wt. % of the total solids of the aqueous composition.

22. A process according to claim 1 wherein the polymer from the ethylenically unsaturated monomer represents about 60 to about 99 wt. % of the total solids of the aqueous composition.

23. A process according to claim 22 wherein the polymer from the ethylenically unsaturated monomer represents about 70 to about 98 wt. % of the total solids of the aqueous composition.

24. A process according to claim 23 wherein the polymer from the ethylenically unsaturated monomer represents about 80 to about 96 wt. % of the total solids of the aqueous composition.

25. A process according to claim 1 wherein said surfactant represents about 0.15% to about 8% of the total solids of the aqueous composition.

26. A process according to claim 25 wherein said surfactant represents about 0.5% to 2% of the total solids of the aqueous composition.

27. A process according to claim 1 wherein said tackifier is dissolved in at least one ethylenically unsaturated monomer to form a tackifier/monomer mixture, and said tackifier/monomer mixture is then dispersed in an aqueous medium comprising surfactant and water to form the mixture.

28. A process according to claim 1 wherein said mixture further comprises a rubber compound.

29. A process according to claim 1 wherein said shearing is conducted using a high shearing device to form droplets ranging in size from about 50 to about 500 nanometers to form the mini-emulsion.

30. A process according to claim 1 wherein said initiator is at least one selected from the group consisting of ammonium persulfate, alkali persulfate, hydrogen peroxide, t-butyl hydroperoxide, di-benzoyl peroxide, lauryl peroxide, di-tertiarybutylperoxide, 2,2-azobisisobutyronitrile, and benzoyl peroxide.

31. A process according to claim 1 wherein said mixture further comprises at least one reducing agent.

32. A process according to claim 31 wherein said reducing agent is at least one selected from the group consisting of sodium bisulfite, sodium hydrosulfite, sodium formaldehyde sulfoxylate, ascorbic acid, and isoascorbic acid.

33. A process according to claim 1 wherein said mixture further comprises at least one catalyst.

34. A process according to claim 33 wherein said catalyst is at least one transition metal compound.

35. A process according to claim 34 wherein said catalyst is ferrous sulfate heptahydrate, or ferrous chloride, or chelated forms of ferrous sulfate heptahydrate and ferrous chloride, and mixtures thereof.

36. An aqueous composition produced by the process of claim 1.

37. An aqueous composition produced by the process of claim 27.

38. An adhesive comprising said aqueous composition of claim 36.

39. An adhesive according to claim 36 wherein said adhesive is utilized to produce pressure sensitive adhesives, coatings, and laminates.

40. An adhesive according to claim 38 wherein said adhesive is produced by coating said aqueous composition onto a substrate.

41. An adhesive according to claim 40 wherein said aqueous composition is coated onto said substrate by a method selected from the group consisting of roll-coating, curtain coating, gravure printing, and slot die coating.

42. An adhesive according to claim 40 wherein said substrate is selected from the group consisting of paper, polyolefin films, metals, glass, urethane elastomers, primed (painted) substrates, and polyesters.

43. An adhesive according to claim 38 further comprising at least one compound selected from the group consisting of post-added tackifiers dispersions, plasticizers, solvents, defoamers, neutralents, preservatives, and surfactants.

44. A coating comprising said aqueous composition of claim 1.

45. A laminate comprising said aqueous composition of claim 1.

46. An article comprising said aqueous composition of claim 1.

* * * * *